United States Patent
Hegarty et al.

(10) Patent No.: US 11,464,234 B2
(45) Date of Patent: *Oct. 11, 2022

(54) PIZZA OVEN

(71) Applicant: Wood Stone Corporation, Bellingham, WA (US)

(72) Inventors: Harry E. Hegarty, Bellingham, WA (US); Lawrence Byron Johnson, Bellingham, WA (US); Kurt Eickmeyer, Bellingham, WA (US); Bryan Martens, Bellingham, WA (US); Greg Bird, Bellingham, WA (US); Mark Stephenson, Bellingham, WA (US); Brett Van Leeuwen, Bellingham, WA (US)

(73) Assignee: Wood Stone Corporation, Bellingham, WA (US)

( * ) Notice: Subject to any disclaimer, the term of this patent is extended or adjusted under 35 U.S.C. 154(b) by 368 days.

This patent is subject to a terminal disclaimer.

(21) Appl. No.: 16/581,573

(22) Filed: Sep. 24, 2019

(65) Prior Publication Data

US 2020/0015484 A1    Jan. 16, 2020

Related U.S. Application Data

(63) Continuation of application No. 15/792,529, filed on Oct. 24, 2017, now Pat. No. 10,420,347, which is a
(Continued)

(51) Int. Cl.
| | | |
|---|---|---|
| *A21B 1/44* | (2006.01) | |
| *A21B 1/00* | (2006.01) | |
| *A21B 1/40* | (2006.01) | |
| *A21B 1/33* | (2006.01) | |
| *F24C 15/14* | (2006.01) | |

(52) U.S. Cl.
CPC ............. *A21B 1/40* (2013.01); *A21B 1/33* (2013.01); *A21B 1/44* (2013.01); *F24C 15/14* (2013.01)

(58) Field of Classification Search
CPC . H05B 1/0258–0263; A47J 37/01–015; A21B 1/00–44
See application file for complete search history.

(56) References Cited

U.S. PATENT DOCUMENTS

| | | |
|---|---|---|
| 3,301,172 A | 1/1967 | Haro |
| 3,349,726 A | 10/1967 | Laszlo |
| (Continued) | | |

FOREIGN PATENT DOCUMENTS

| | | |
|---|---|---|
| BR | PI1107198 A2 | 10/2013 |
| CN | 201710175 U | 1/2011 |
| (Continued) | | |

OTHER PUBLICATIONS

International Searching Authority, International Search Report, PCT/US2014/035044, dated Sep. 25, 2014, 3 pages.

*Primary Examiner* — Michael A Laflame, Jr.
(74) *Attorney, Agent, or Firm* — Schacht Law Office, Inc.; Dwayne Rogge

(57) ABSTRACT

This disclosure relates to the field of cooking ovens for the preparation of foodstuffs in an enclosed environment including a visual flame along with a rotating cooking plate upon which foodstuffs are placed and are transported through various cooking regions before being removed from the cooking oven for consumption.

14 Claims, 9 Drawing Sheets

Related U.S. Application Data continuation of application No. 14/259,019, filed on Apr. 22, 2014, now Pat. No. 9,795,147.

(60) Provisional application No. 61/814,748, filed on Apr. 22, 2013.

(56) References Cited

U.S. PATENT DOCUMENTS

| | | |
|---|---|---|
| 4,305,329 A | 12/1981 | Fenoglio |
| 4,384,513 A | 5/1983 | Pierick |
| 4,411,920 A | 10/1983 | Fenoglio |
| 4,453,064 A | 6/1984 | Toyoda et al. |
| 4,924,763 A | 5/1990 | Bingham |
| 5,130,320 A | 7/1992 | Getman et al. |
| 5,131,320 A | 7/1992 | Jensen et al. |
| 5,205,274 A | 4/1993 | Smith et al. |
| 5,315,922 A | 5/1994 | Keller |
| 5,365,833 A | 11/1994 | Chen |
| 5,398,666 A | 3/1995 | Smith et al. |
| 5,492,055 A | 2/1996 | Nevin et al. |
| 5,605,092 A | 2/1997 | Riccio |
| 5,695,668 A | 12/1997 | Boddy |
| 5,945,023 A | 8/1999 | Yang |
| 6,080,496 A | 6/2000 | Hupf et al. |
| 6,146,677 A | 11/2000 | Moreth |
| 6,222,163 B1 | 4/2001 | Amtz et al. |
| 6,250,210 B1 | 6/2001 | Moreth |
| 6,425,388 B1 | 7/2002 | Korinchock |
| 6,745,758 B1 | 6/2004 | Minidis |
| 7,357,131 B2 | 4/2008 | Moreth, III et al. |
| 7,759,617 B2 | 7/2010 | Bowles et al. |
| 8,042,458 B2 | 10/2011 | Ueda et al. |
| 8,181,640 B2 | 5/2012 | Park |
| 8,291,896 B1 | 10/2012 | Gonnella et al. |
| 8,624,166 B2 | 1/2014 | Moreth, III |
| 8,948,579 B2 | 2/2015 | Lee |
| 9,182,129 B2 | 11/2015 | Dahle et al. |
| 9,795,147 B2 | 10/2017 | Hegarty et al. |
| 10,420,347 B2 | 9/2019 | Hegarty et al. |
| 2002/0088111 A1 | 7/2002 | Arx et al. |
| 2002/0130190 A1 | 9/2002 | Marbach et al. |
| 2004/0211406 A1 | 10/2004 | Cornfield |
| 2006/0090741 A1 | 5/2006 | Bowles et al. |
| 2007/0108177 A1 | 5/2007 | Engelhardt |
| 2010/0209083 A1 | 8/2010 | Lee |
| 2011/0048244 A1 | 3/2011 | Wiker |

FOREIGN PATENT DOCUMENTS

| | | |
|---|---|---|
| CN | 101686777 B | 11/2014 |
| EP | 0781072 A1 | 6/1997 |
| GB | 623040 A | 5/1949 |
| JP | 2008541988 A | 11/2008 |
| MX | 372139 | 3/2020 |
| RU | 2052175 C1 | 1/1996 |
| RU | 24357 U1 | 8/2002 |
| SU | 1296111 | 3/1987 |
| WO | 1992020232 A1 | 11/1992 |
| WO | 2006132904 A2 | 12/2006 |
| WO | 2010080160 A1 | 7/2010 |

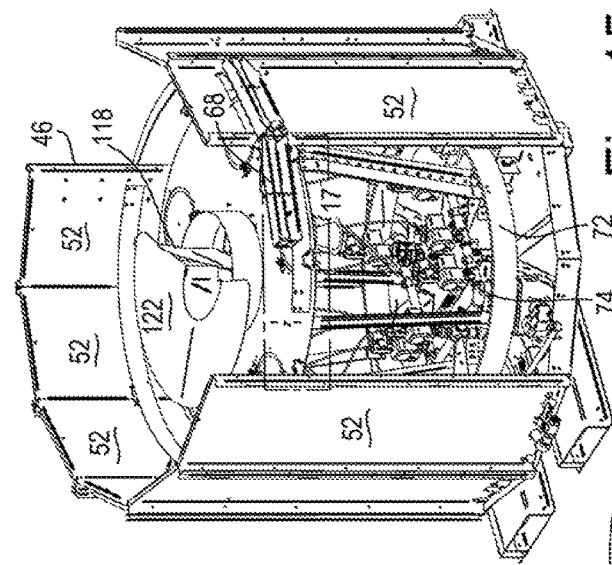
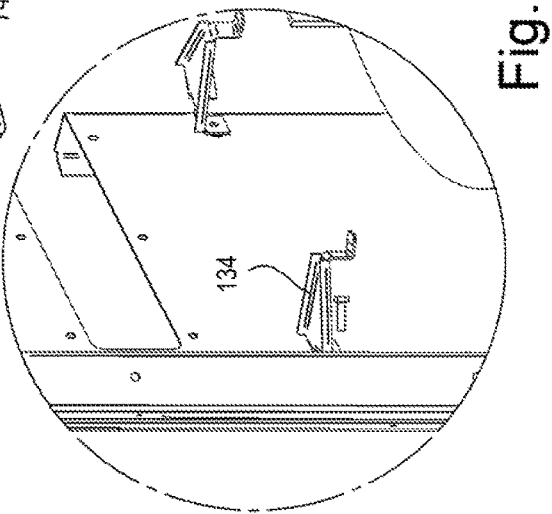
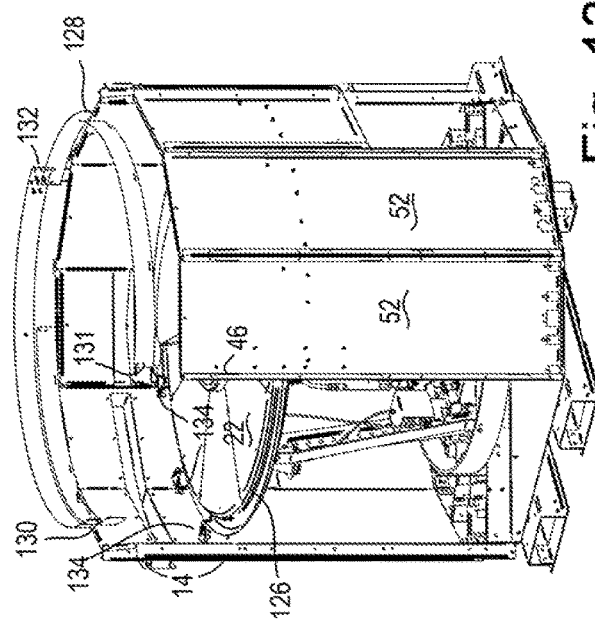
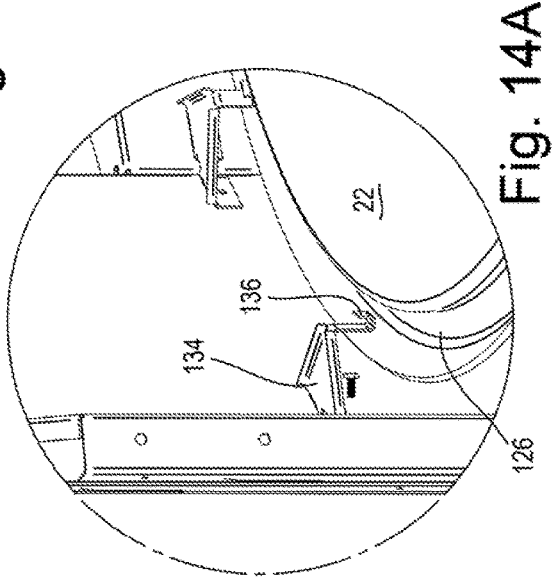

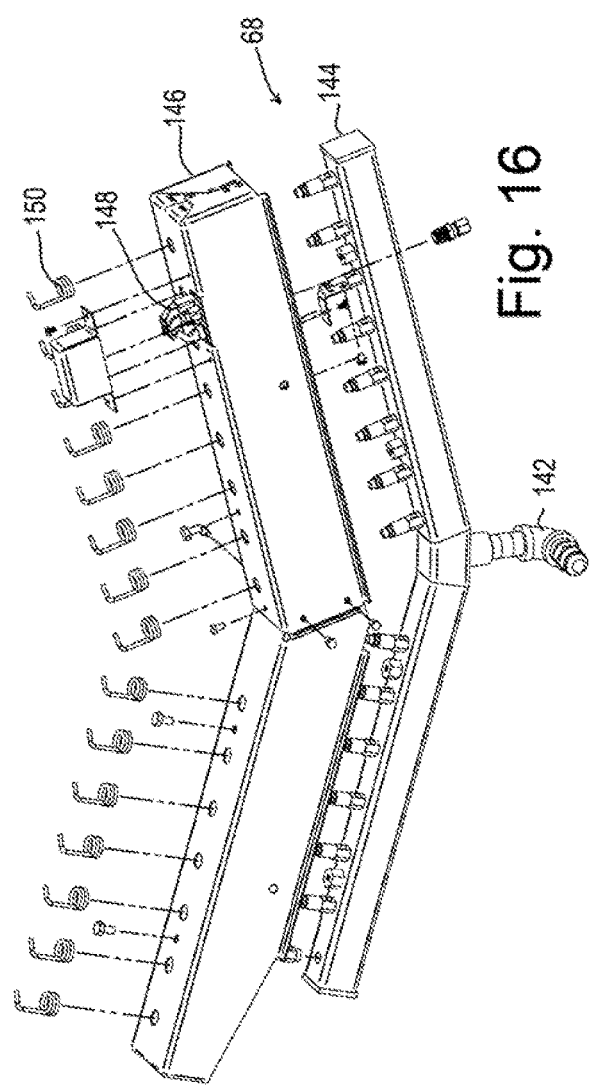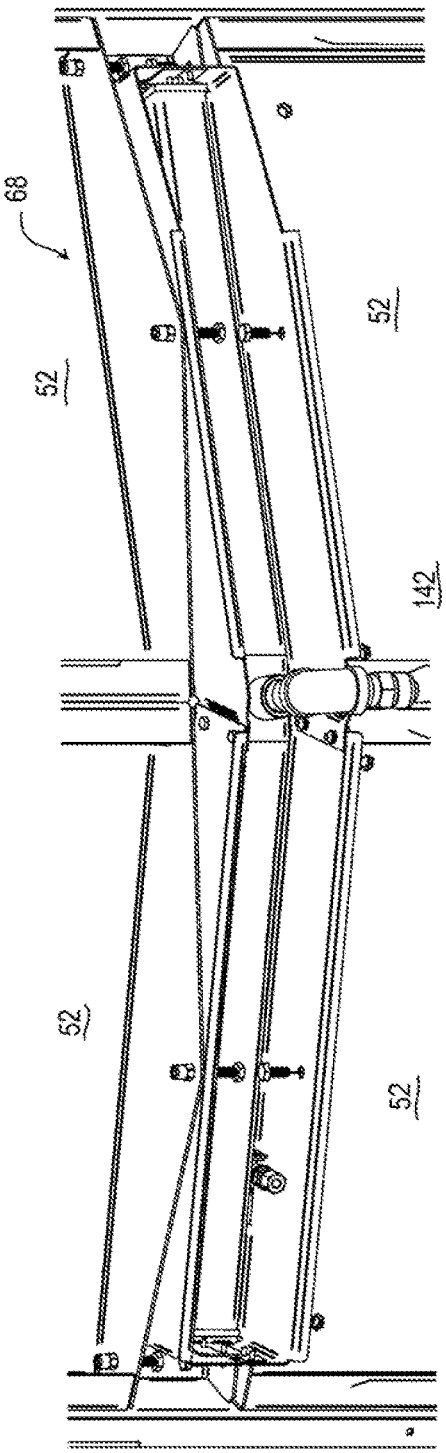

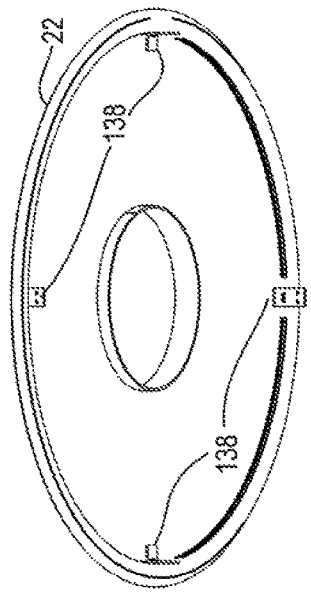
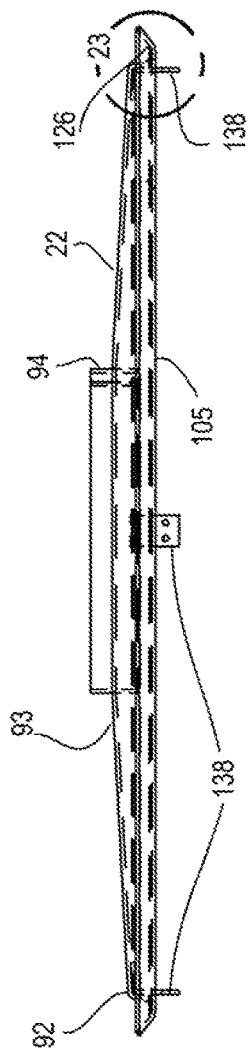
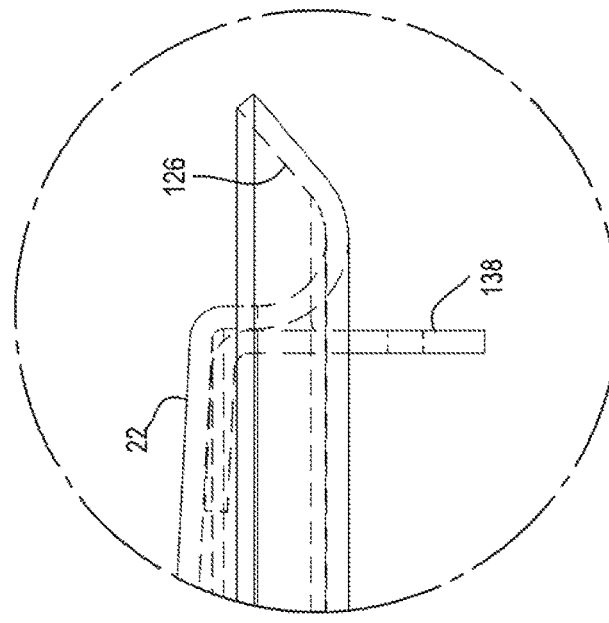
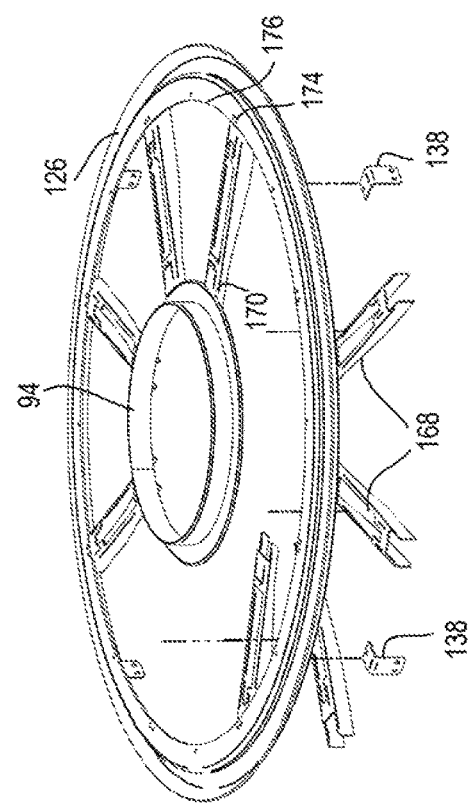

PIZZA OVEN

RELATED APPLICATIONS

This application is a continuation of U.S. Ser. No. 15/792,529 filed Oct. 24, 2017, incorporated herein by reference. U.S. Ser. No. 15/792,529 is a continuation of U.S. Ser. No. 14/259,019 filed Apr. 22, 2014, now U.S. Pat. No. 9,795,147, incorporated herein by reference. U.S. Ser. No. 14/259,019 claims priority benefit of U.S. Provisional Ser. No. 61/814,748 filed Apr. 22, 2013, also incorporated herein by reference.

BACKGROUND OF THE DISCLOSURE

Field of the Disclosure

This disclosure relates to the field of cooking ovens for the preparation of foodstuffs in an enclosed environment including a visual flame along with a rotating cooking plate upon which foodstuffs are placed and are transported through the various cooking environments before being removed from the cooking oven for consumption.

SUMMARY OF THE DISCLOSURE

Disclosed herein is an oven for cooking of foodstuffs, the oven comprising: a cooking chamber in an upper inner portion of the oven, the cooking chamber bounded on the lower surface by a rotating cooking plate having a surface defining a central void there through, a doorway at a front portion of the oven providing food access to the cooking chamber; a central heat source at the central void of the cooking plate visible through the doorway; and at least one heat source below the cooking plate.

The cooking oven as recited herein comprising in one example a drive system in the inner lower portion of the oven for rotation of the cooking plate relative to the doorway.

The cooking oven as recited herein may be arranged wherein the drive system is variable speed.

The cooking oven as recited herein may be arranged wherein the cooking plate is coated with an aluminum oxide finish to enhance cooking and avoid slippage of the foodstuffs on the cooking plate.

The cooking oven as recited may be arranged wherein the cooking plate is arcuate in cross-section having a raised portion at the radial center.

The cooking oven as recited herein may be arranged wherein the cooking plate comprises a debris collecting channel in the radially outer portion thereof.

The cooking oven as recited herein may be arranged wherein the oven comprises a debris ring removably attached to an inner surface of the oven and extending downward into the debris collecting channel.

The cooking oven as recited herein in one example comprising an apparatus providing a visible central radiant heating flame at the central void.

The cooking oven as recited herein in one example comprising: a perimeter multi-flame manifold at a circumferentially offset location in the cooking chamber relative to the doorway; and circuitry coupled to valves controlling fluid (gas) flow to the central radiant heating flame and valves controlling fluid (gas) flow to the perimeter multi-flame manifold to maintain a thermal output offset between the central radiant heating flame and perimeter multi-flame manifold.

The cooking oven as recited herein may be arranged wherein the circuitry is coupled to a thermal detector in the cooking chamber to adjust the thermal output of the central radiant heating flame and perimeter multi-flame manifold as a function of the temperature within the cooking chamber.

The cooking oven as recited herein may be arranged wherein the at least one heat source below the cooking plate is a radiant heat source.

The cooking oven as recited herein may be arranged wherein the radiant heat source is a gas flame heat source.

The cooking oven as recited herein may be arranged wherein the radiant heat source is a fiber mesh heat source.

The cooking oven as recited herein further comprising in one example: at least one sensor detecting the localized temperature of the cooking plate; and a control apparatus varying the thermal output of the at least one heat source below the cooking plate as a function of the sensed localized temperature.

The cooking oven as recited herein further comprising in one example: at least one sensor detecting the localized temperature of the air adjacent the cooking plate; and a control apparatus varying the thermal output of the at least one heat source below the cooking plate as a function of the sensed localized temperature.

The cooking oven as recited herein further comprising in one example: at least one sensor detecting entry of an uncooked foodstuff; circuitry programmed to account for the additional thermal load added to the system by the uncooked foodstuff; and a control apparatus varying the thermal output of the at least one heat source below the cooking plate as a function of the uncooked foodstuff.

The cooking oven as recited herein comprising in one example a central heat deflector positioned radially between the central radiant heating flame and a baking region of the cooking plate.

The cooking oven as recited herein may be arranged wherein the cooking plate further comprising a perimeter multi-flame manifold at a circumferentially offset broiling region in the cooking chamber.

The cooking oven as recited herein further comprising in one example a baking region comprising a heat shield above the cooking plate and below the uppermost internal surface of the cooking chamber.

BRIEF DESCRIPTION OF THE DRAWINGS

FIG. 5 is an isometric partially disassembled view of the example shown in

FIG. 1.

FIG. 13 is a front isometric view of the example of FIG. 12 with a debris shield being attached thereto.

FIG. 14A is a detail enlarged view of the region 14 of FIG. 13.

FIG. 14B is an alternate example of the assembly shown in FIG. 14A.

FIG. 15 is a side isometric view of an example similar to that shown in FIG. 13 showing a radially outer side of a side burner assembly.

FIG. 16 is an exploded isometric view of the side burner assembly shown in FIG. 15.

FIG. 17 is a detail enlarged view of the region 17 of FIG. 15.

FIG. 20 is a top isometric view of another example of the rotating cooking plate component of FIG. 1.

FIG. 21 is a bottom isometric view of the example of FIG. 20.

FIG. 22 is a side hidden line view of the example of FIG. 20.

FIG. 23 is a detail enlarged view of the region 23 of FIG. 22.

DESCRIPTION OF THE PREFERRED EMBODIMENTS

Figure 1:
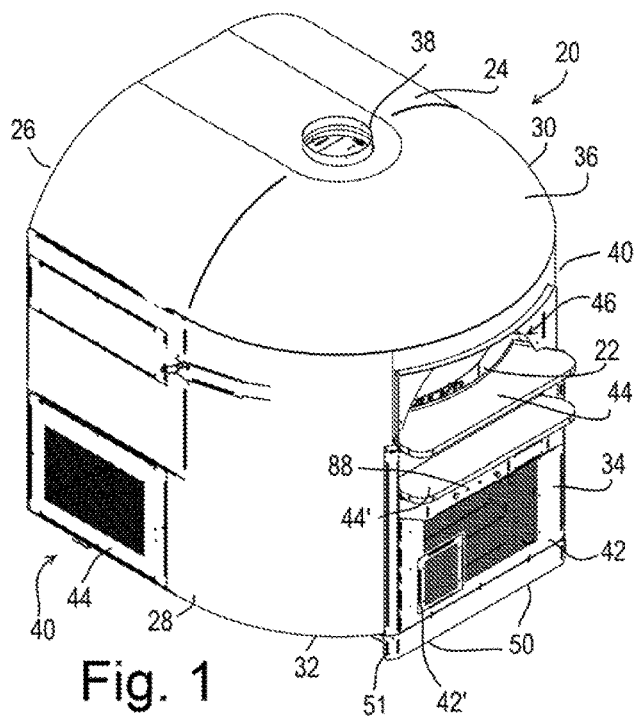
FIG. 1 is a front isometric view of one example of the disclosed apparatus in a nearly completed stage of construction/assembly.
Figure 2:
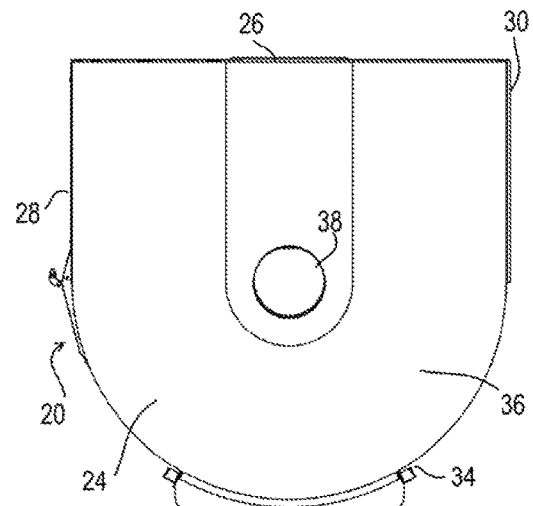
FIG. 2 is a top view of the example shown in FIG. 1.
Figure 3:
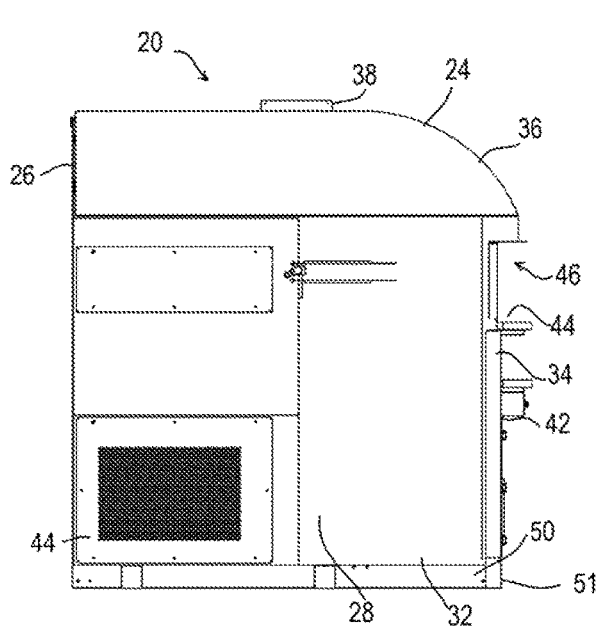
FIG. 3 is a left side view of the example shown in FIG. 1

Disclosed herein is an oven 20 for the cooking therein of pizzas and other foodstuffs on a rotating plate 22. For ease in description, the term pizza will be used to cover pizzas and other similarly cooked foods such as sandwiches, etc. For illustrative purposes, a top 24, rear side 26, right side 30, left side 28, bottom 32 and front side 34 are defined. The left/right sides are not in this example symmetrical through a vertical plane and may be made as a mirror image. So as to give a general appearance of a Naples style oven, the overall shape of the oven 20 including the top 24 may be given the general shape of a Naples style historical oven. In addition, the top 24 in this example comprises a dome cap 36 having in one example an upper vent 38 is provided in the upper central portion thereof. To facilitate inclusion of this radially central upper vent 38 has specialized ducting and configuration in the interior portion of the oven 20 as will be understood later. In one form, stucco or other ornamental features may be attached to the exterior surface 40 of the oven 20 to further enhance the visual appeal and in one form to further give the impression of a Naples style oven. To facilitate such attachment, the outer surface of the oven housing may be covered with a wire mesh to ease in later attachment of the decorative covering once the oven is installed and tested.

Figure 7:
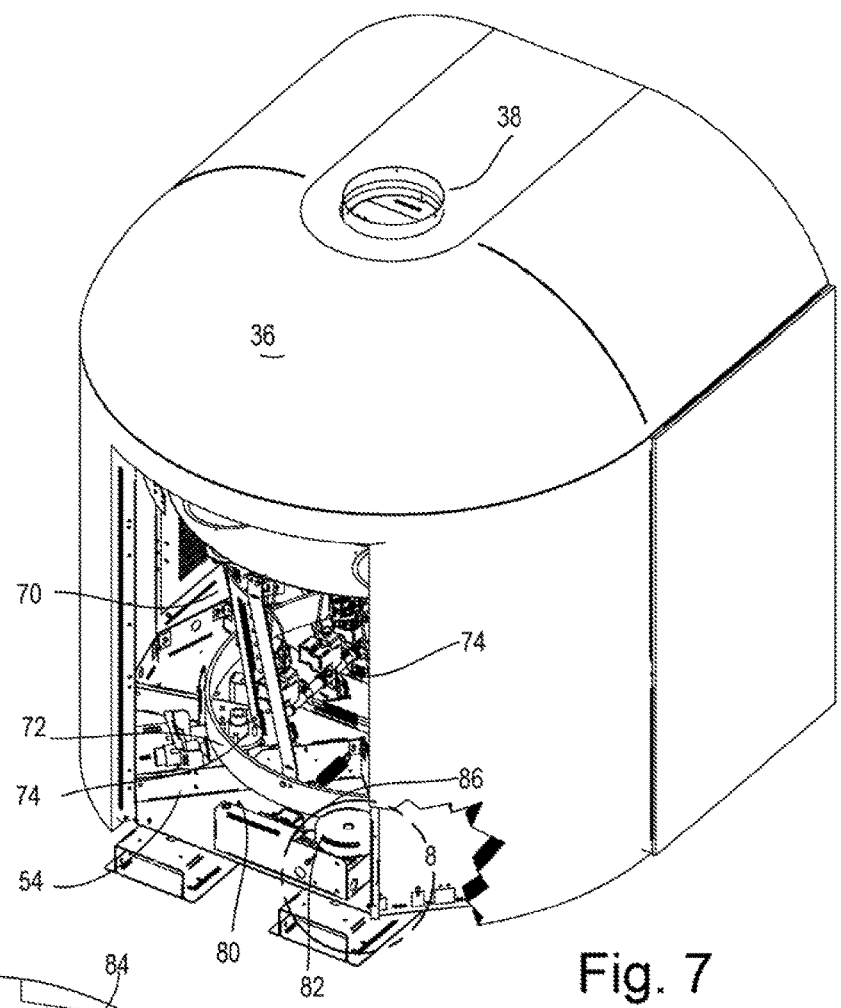
FIG. 7 is a front isometric view of the example shown in FIG. 1 with a front panel and inner panel removed to show working components therein.

To allow access to the interior portion for repairs, maintenance, or cleaning, a front access panel 42 and/or side access panel(s) 44 may be utilized. In FIG. 7 for example, the front access panel has been removed to show the inner workings of the oven. In one form, the access panels 42 and 44 may be a mesh, louvered, or otherwise non-solid material so as to allow and facilitate airflow into the apparatus. A sub-panel 42' may be used to access a smaller portion of the front without removing the entire front panel 42. Any of the panels may include safety circuitry interlock to shut off or disable any electrical, flame, or gas supply when the panel is opened. In addition, a safety interlock may be provided to avoid rotation of the cooking plate when any panel is opened.

As several heating elements, including oxidizing heating elements (burners), may be utilized in the lower portion of the oven below the cooking plate 20, it will be generally desirous to have substantial amount of airflow through the lower portion of the oven 20 to reduce problems of insufficient burn and avoid overheating.

As it may damage the cooking plate to unevenly heat the cooking plate, an interlock system may be provided to prohibit heat applied via the under-plate heaters unless the cooking plate 22 is rotating. Thus, the main switch may have three positions: off-run-fire. In this way the apparatus may be turned off, may be run (rotated) without heat, and may be rotated with heat applied.

An internal thermocouple may be provided to turn off all burners if a safety heat level is exceeded.

Figure 4:
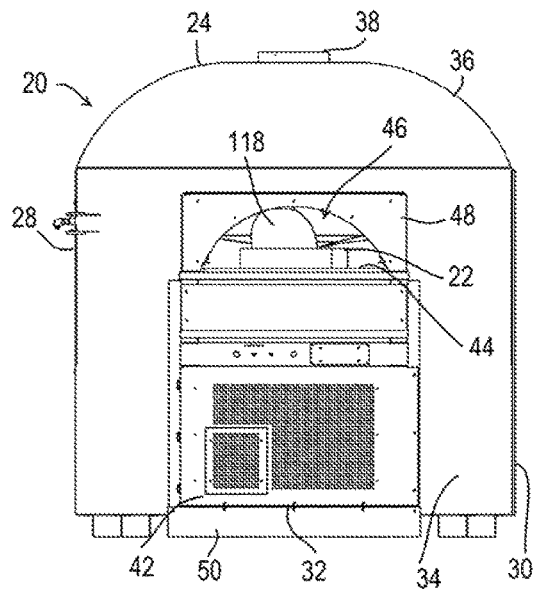
FIG. 4 is a front view of the example shown in FIG. 1.

As shown in FIG. 1, at least one example of the oven 20 comprises a rotating cooking plate 22 adjacent a front shelf 44 which facilitates insertion and removal of foodstuffs to be cooked. A second front shelf 44' may also be provided. In one form, the cooking plate 22 is a plate apparatus, such as aluminum, with the upper surface and the lower surface coated to enhance thermal absorption, durability, and/or foot positioning. In later examples, the cooking plate is assembled from sub-portions to account for thermal expansion, reduce manufacturing difficulties and costs, and to allow for replacement of individual sub-portions if a sub-portion is damaged. In one form, as the cooking plate 22 generally rotates, such a shelf 44 is especially useful to help set foods there on prior to insertion and post cooking on a non-rotating surface. To allow for foodstuffs be easily placed into the oven an entry/exit 46 may be provided. In one form the entry is defined by the shelf 44 as well as a removable panel 48 (FIG. 4). While the inner most shape of this panel 48 is shown as being arcuate, other shapes may be utilized for artistic and/or functional desires. The panel 48 also helps to keep heat within the apparatus.

As the overall apparatus may be very large—on the order of 6 feet wide from left side to right side, 6 feet deep from front side to rear side, and 6 feet tall from bottom to top—the overall apparatus is very heavy and thus in one form lift struts 50 may be provided into which or below which the forks of a fork truck, hand truck, or other lifting apparatus may be inserted to lift and reposition the oven 20. These lift struts may be hidden from view by a cover panel 51 when installed for aesthetic improvement.

Figure 5:
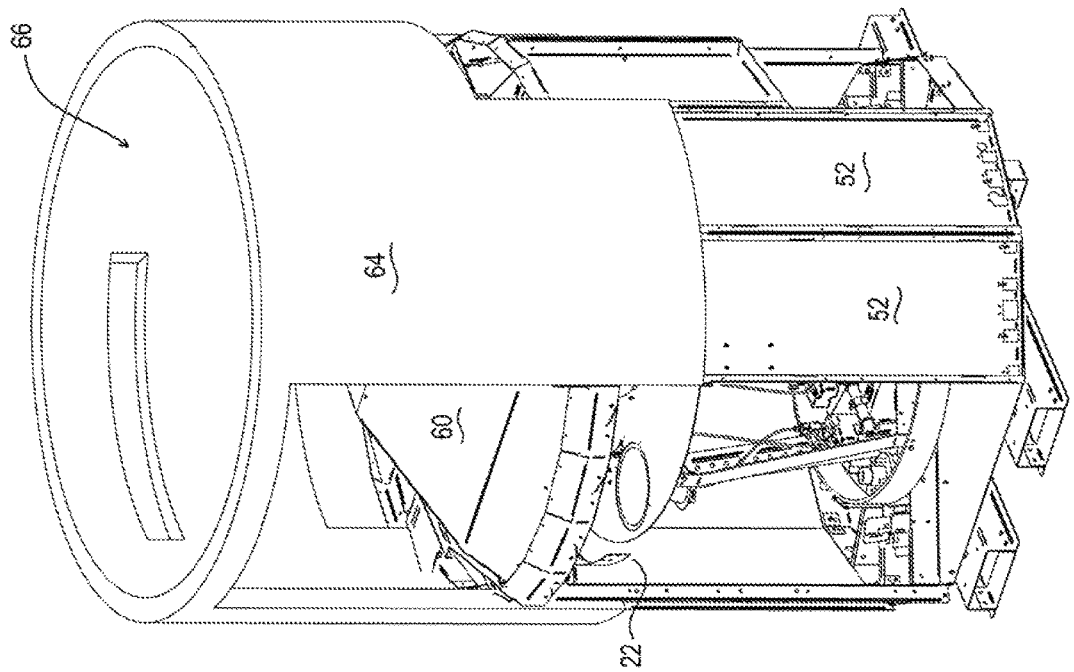

Looking to FIG. 5, it can be appreciated that a thermal insulating barrier 64 may be provided to insulate the outer housing from the cooking chamber 66.

Figure 6:
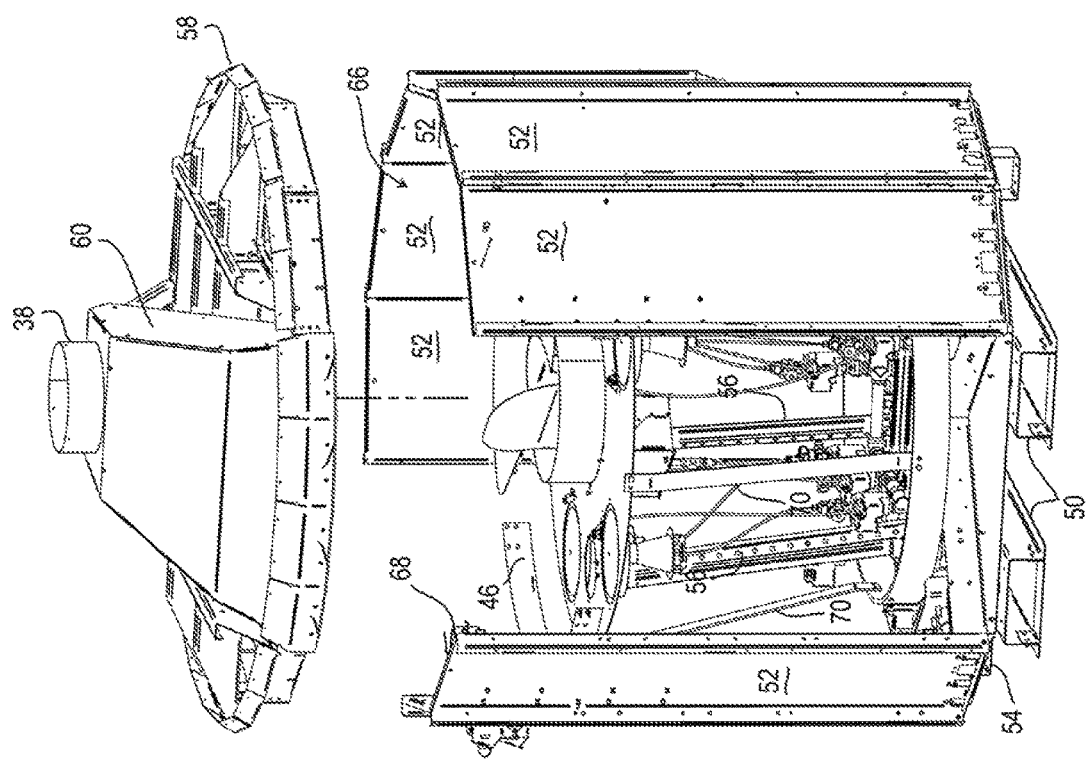
FIG. 6 is an isometric view of a partially disassembled view of the example shown in FIG. 1 with additional components removed from the view of FIG. 5.

Looking to FIG. 6, the thermal barrier 64 has been removed and in addition, a ceiling assembly 58 is being removed from the lower components. As the ceiling assembly 58 generally comprises a cast member 69 which is substantially non-permeable to gases at a low pressure differential. The oven generates a great deal of exhaust gas, other scents, smells and heat within the cooking chamber 66 and thus some sort of vent 38 will be desired. It has been shown that providing the vent ductwork 60 near the front 34 of the oven 20 reduces heat and exhaust gases through the entry/exit 46. As shown in FIG. 6, the ductwork 60 redirects the exhaust from a central portion, adjacent an edge surface 62 (see FIGS. 18 and 19) toward the central vent 38. This maintains the Naples oven style. Returning to FIG. 6 for the moment, a plurality of heat reflective panels 52 are provided between the insulating layer 64 and the cooking chamber 66 to provide rigid support for the ceiling assembly 58 as well as to protect the insulator 64.

A framework 54 is attached to the lift struts 50 and provides a rigid support for the panels 52 as well as for center struts 56 which will be described in more detail but generally support a center flame apparatus, central heat deflector, and other components. A perimeter gas flame jet manifold 68 is provided circumferentially offset from the doorway 46.

Figure 8:
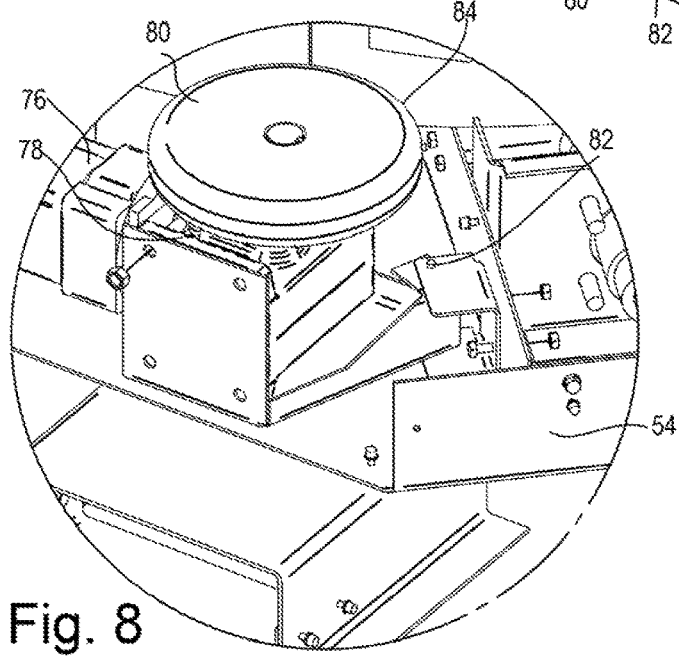
FIG. 8 is a detail view of an alternate example of the region 8 shown in FIG. 7.

Looking to FIG. 7, the apparatus is shown generally assembled save for the front access panel 42 as well as an instrument/readout/control panel provided between the access panel 42 and the entry or doorway 46. FIG. 7 shows how the rotating plate 22 may be supported by a plurality of support struts 70 attached at a lower region to a ring 72. In one form, the ring is supported by a plurality of spindles 74. In one form the spindles 74 comprise ball bearings and may be tapered to account for the rotational differential of the ring 72. FIG. 8 shows a detail view of another example of the apparatus shown in FIG. 7 where in a drive motor 76 is attached to a gearbox 78 having a rotating wheel 80 attached thereto so as to rotate when the motor 76 is engaged. In one form, this assembly is attached to the frame 54 by way of an axle 82 and an elastic member such as a spring or equivalent to bias the outer edge 84 of the wheel 80 toward the outer edge 86 of the ring 72. In this way, as the motor 76 rotates the wheel 80, the ring 72, support struts 70, and cooking plate 22 rotate as well. This contact drive system is much less impacted by contaminates than other drive systems utilizing gears, belts or other systems and is not significantly impacted by large heat variances. The system should also be less prone to accidentally injure maintenance personnel as it allows slippage of the drive ring to the wheel. In one form, controls may be provided on the control panel 88 for the cook(s) to adjust the variable rotational speed of the cooking plate 22 for example to cook thin or thick crust pizzas. In FIG. 7, the axle 82 is attached at the opposing end of the motor assembly relative to the example of FIG. 8.

Figure 9:
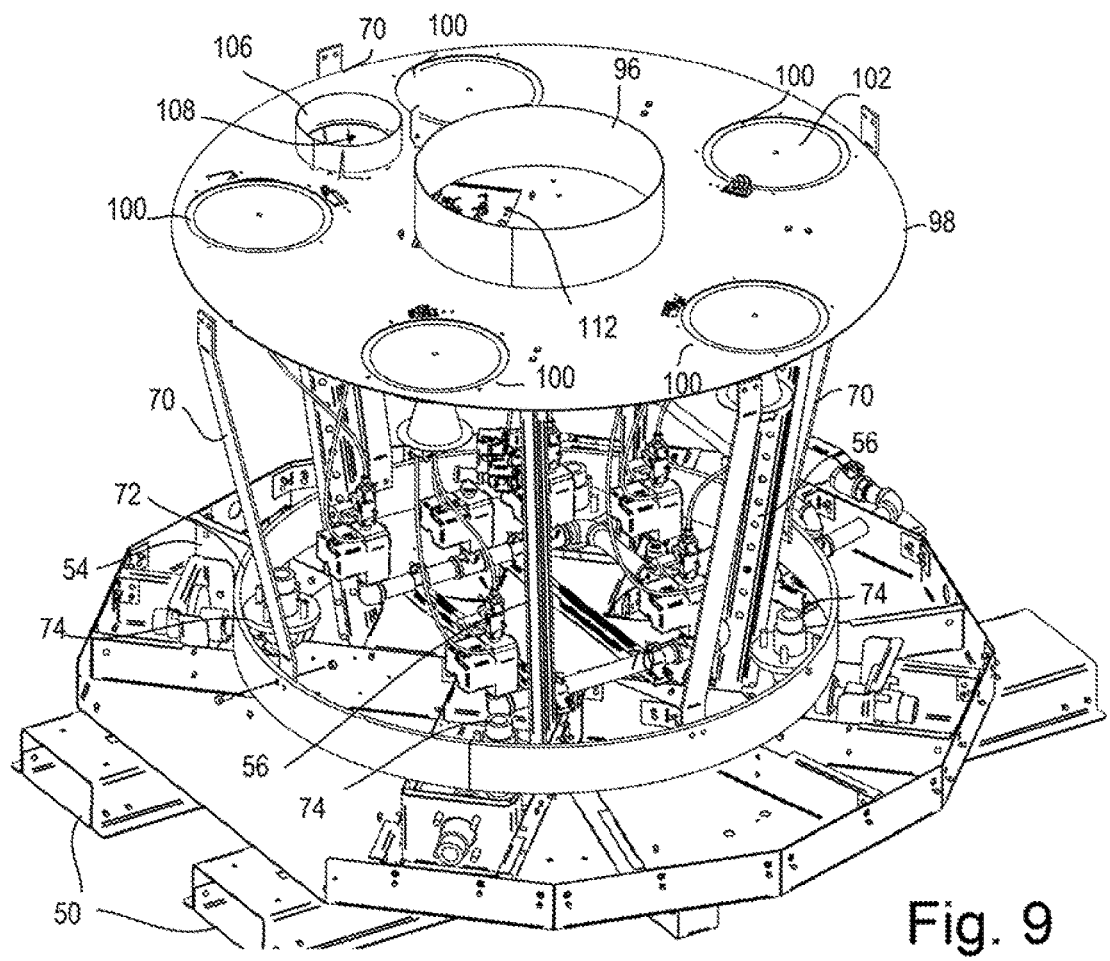
FIG. 9 is an isometric view further disassembled from that shown in FIG. 6.
Figure 10:
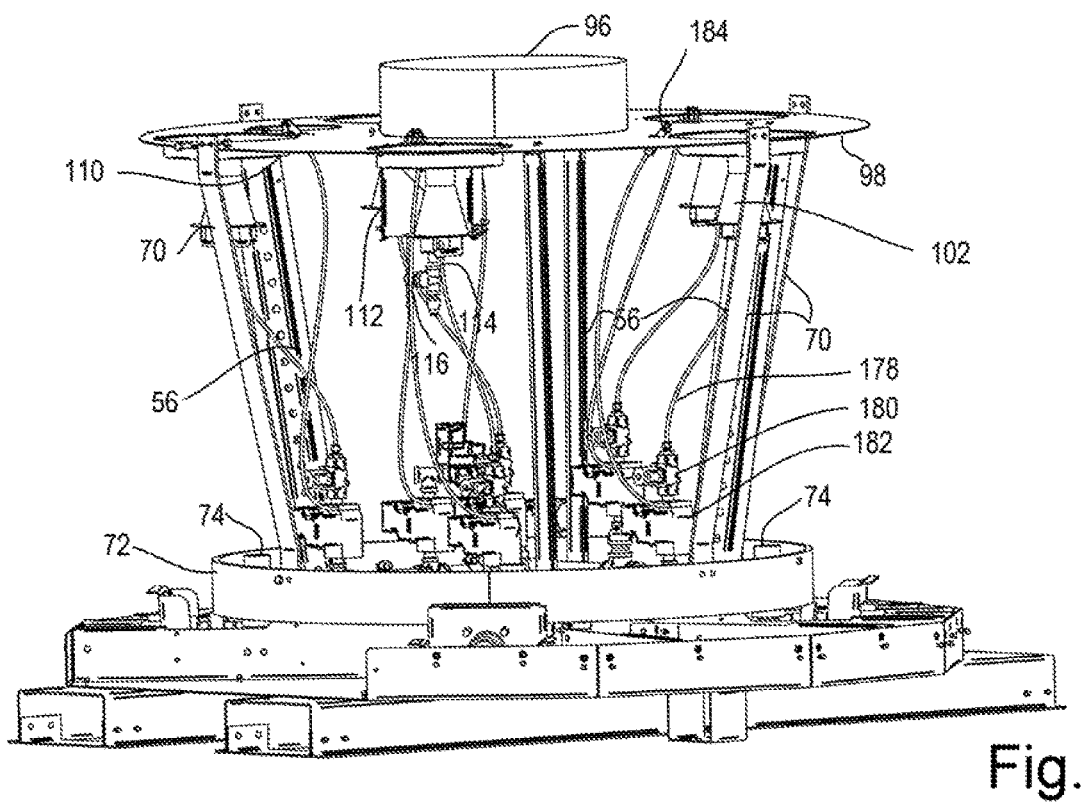
FIG. 10 is a front isometric view of the example of FIG. 9 with a rotating cooking plate attached thereto.
Figure 12:
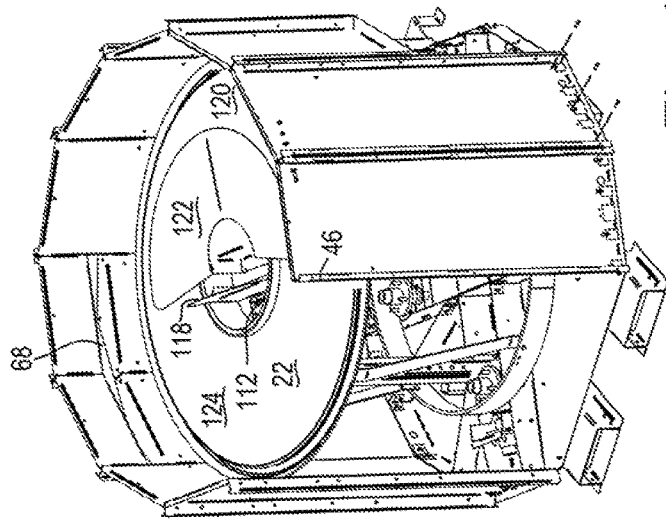
FIG. 12 is a top isometric view of the example shown in FIG. 11 with side heat deflecting shields attached thereto.

Looking to FIG. 10, it can be appreciated that the elements previously described are shown from another view such as that shown in FIGS. 6 and 7, with the outer housing including the panels 52 removed to more sufficiently show the internal components. As can be seen when looking to FIG. 22, the cooking plate 22 may be "domed" or arcuate from the outer portion 92 to an inner portion 93. In this way, as the cooking plate 22 heats up and expands due to thermal expansion, the support struts 70 will generally be forced radially outward and the center debris ring 94 will be positioned slightly upward and inward but given sufficient clearance, and will not engage a central guide ring 96 affixed to the infrared heater support plate 98, better seen in FIG. 9.

In FIG. 9, the rotating support struts 70 are shown affixed to the ring 72 and extending radially outward of and vertically above the support plate 98. In this Figure, the cooking plate 22 has been removed to more adequately show this arrangement. As shown, a plurality of surfaces defining voids 100 may be provided for attachment and securing of infrared (IR) or other radiant heaters 102. These radiant heaters 102 are shown in one configuration in FIG. 11. In addition, small heat deflecting plates may be provided to deflect radiant heat toward the desired position on the underside of the cooking plate 22. Such plates may extend vertically from the support plate 98 in a plane parallel to the radius from the center of the cooking plate 22. In one form, the underside 105 of the cooking plate 22 may be treated to improve thermal absorption and/or retention. In one form, the treatment comprises a radiant heat absorbing component. In one form, heat resistant black paint or another dark surface may be utilized.

FIG. 9 also shows a ring 106 surrounding a surface defining an opening 108. In one form, one or more thermal detection devices (sensors) 110 are attached to the frame 54 and each senses upwards through the opening 108 to the underside 105 of the cooking plate 22. In one form, the sensors 110 detect infrared (IR) energy (radiation) emitting from the plate cooking 22. In this manner, localized "cold spots" can be detected on the underside 105 of the cooking plate 22. Such cold spots can be overcome by activation of the radiant heaters 102 timed to pre-heat and provide a calculated amount of heat to the cold spot for a calculated time as the cold spot passes each of the radiant burners. If the thermal differential of a cold spot to the desired temperature is relatively small, only one burner may be used, and possibly for a short and low burn time. If, however the cold spot is significant, more burners may be used as the cold spot approaches and passes each of the radiant burners.

Looking to FIG. 10, several radiant burners 102 are shown coupled via piping 178 to gas valves 180 and control valves 182 to a central gas manifold. An igniter 184 or pilot light may also be used. Each of these valves and igniters may be controlled in one example by a programmable circuit. As there may be 7 or more pilot lights (one for each burner assembly) the heat produced by the pilot lights alone is significant.

Alternatively, the radiant heaters 102 may be electric or other heat sources.

In another example, a sensor may be positioned so as to detect entry of a pizza, whereupon the system anticipates the thermal load on the system of an uncooked pizza and adjusts the heating elements to account.

Each of these sensing and heating methods may be used in combination.

In one form, the cooking plate 22 comprises a low thermal storage capacity product such that when an uncooked pizza, for example, is placed upon the preheated cooking panel 22, a heat transfer occurs between the cooking panel 22 and the pizza. Aluminum is one material that has been found to have a low thermal storage capacity, and high thermal conductivity. Although numerous heating devices are used to heat the cooking plate 22 as well as directly heat the pizzas upon the surface of the cooking plate 22, especially in high production applications; it is desired to maintain as close to a uniform heat distribution not only across the cooking plate 22 but from cooking cycle to cooking cycle.

In operation, it has been found that this region of the oven often contains a large amount of airborne particulates when in operation. Small particles of pizza crust or other small light particles become airborne, and travel below the cooking plate 22. This, to keep the sensing portion (lens) clean, a fan or air pump may be mounted with a directional airflow to blow clean air across the lens and keep particulates from depositing there.

In one form of operation, the thermal detection device 110 is positioned approximately 270° and/or approximately 290° as shown in FIG. 15 through rotation of the cooking plate 22 relative to the entry/exit 46. Thus, as a pizza is placed upon the cooking plate 22 and the cooking plate 22 rotates sufficient time is given for heat soak from (through) the cooking plate 22 to the pizza. Thus, as the leading edge of the "cold spot" is detected at the thermal detector 110 timing circuitry is engaged relative to the rotational speed of the cooking plate 22 and the rotational position of subsequent radiant heaters 102. In one form, it may take some time from engagement of the radiant heater 102 to thermal output from the radiant heater 102 and likewise, it may take time from this engagement of the radiant heater 102 to cessation of thermal output from the radiant heater 102. Thus, prior to the "cold spot" being positioned above the radiant heater 102 the radiant heater 102 is engaged such that only when the "cold spot" is vertically above the radiant heater 102 is the radiant heater 102 outputting radiant heat. In addition, the thermal detector 110 may determine the temperature of the "cold spot" and circuitry provided with such data. The circuitry may then determine the number of radiant heaters 102 required to return the "cold spot" back to the desired temperature.

In one example, the center and outer wall heating elements are not varied to account for cold spots.

FIG. 9 also shows a central flame jet assembly 112 coupled to fluid (combustible gas) conduits 114/116 which are in turn coupled to valves controlled by the circuitry previously described. The circuitry in this case may maintain a temperature differential between the central flame jet assembly 112 and the perimeter flame jet assembly 68. For example, due to the relative size of the perimeter of the cooking plate 22 relative to the central portion of the cooking plate 22 it may be desired to maintain the perimeter flame jet assembly 68 at substantially higher temperature or thermal output relative to the temperature or thermal output of the central flame jet assembly 112. Testing has shown that when this temperature differential is not adequately maintained, the edge of the pizza nearest the perimeter flame manifold 80 is substantially darker or lighter than the edge of the pizza nearest to the central flame assembly 112. A device such as a magnetic counter apparatus may be utilized to provide data to the circuitry for determination of rotational speed of the plate 22, and from that given, a median diameter, the speed of the cooking process for the foodstuff can be determined or calculated.

Figure 11:
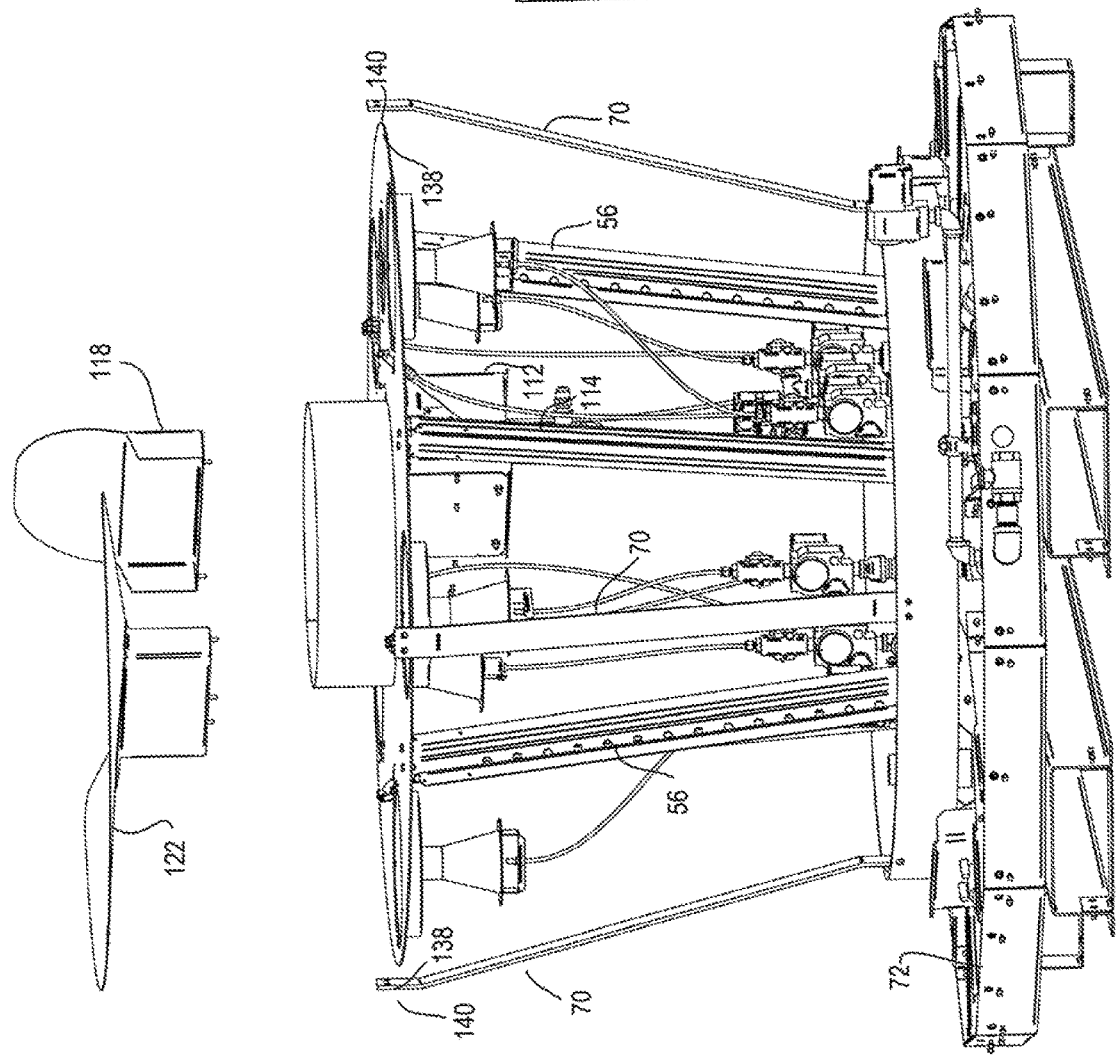
FIG. 11 is an isometric view of the example shown in FIG. 10 with heat deflecting and reflecting shields shown adjacent to and above the cooking plate.

Looking to FIG. 11, it can be appreciated that a central heat deflector 118 may be affixed to the support panel 98 configured not to rotate with the cooking plate 22. This heat deflector may be angled vertically so as to direct radiant heat from the center flame and/or perimeter flame toward the broiling region and away from the baking region. In addition, the cooking plate 22 may rotate through regions of different cooking outcomes. For example, as the crust of the pizza takes substantially longer to cook or "bake" than the toppings, a baking region 120 may be provided adjacent the entryway or opening 46 such that the pizza enters the baking region 120 while being protected in part by a heat deflector 122 from radiant heat directed from the ceiling assembly 58 which will become quite hot in such an environment. In one form, the heat deflector 122 as well as the heat deflector 118 may be formed and/or welded metals such as, for example, stainless steel of sufficient heat resistance to survive in the oven 20 without warping, deforming, or outgassing. Once the pizza leaves the baking region 120 it may enter a broiling region 124 wherein radiant and convection heat from the perimeter flame manifold 68 as well as central flame manifold 112 broils the toppings of the pizza.

While the cook time of the pizza may be affected by the thickness and composition of the crust, thickness and composition of the toppings, as well as the temperature of the oven 20, given our relatively thin style crust with a relatively common thin layer of sauce, toppings, including cheese, this oven has been shown to adequately cook a pizza through a single rotation in 3-4 or in some applications less than two (2) minutes on a continual input/output basis. Testing has shown that 250 to 275 or up to 300 pizzas may be cooked in one hour in an oven of this design without blonding nor burning of the crust nor under cooking nor overcooking of the toppings. In addition, cheffing or lifting of the pizza to the relatively hot ceiling assembly may be avoided.

As it is expected that a relatively small portion of each foodstuff item to be cooked may have debris such as pizza toppings, crust, etc. unintentionally removed therefrom, and it is generally desired for this debris not to be transferred to the lower portion of the oven 20 where it may be difficult to remove, several aspects have been designed for containment and removal of this debris. For example, the domed structure of the cook plate 22 facilitates such removal and that gravity may be utilized to reposition such debris down the arcuate surface toward a debris channel 126 as most easily seen in FIG. 23, but also viewable in FIGS. 13 and 14. The central flange or ring 94 also facilitates containment by substantially prohibiting such debris from entering through the central void. In addition, looking to FIG. 13, a debris ring 128 may be provided internal of the panels 52 and projecting downward into the debris channel 126. As this debris ring 128 is very susceptible to thermal expansion and contraction it may be desired to have it not rigidly attached to the interior portion of the oven 20 such as the panels 52 but rather loosely supported therefrom. In addition, to avoid constricting the entry 46 the debris ring may comprise ends 130/131 on either circumferential side of the opening 46. As any debris passing at this point would be contained by the shelf 44 or fall onto the floor of the room external thereof, in either way it should not be transferred into the lower internal portion of the oven. In the example shown in FIG. 13, the ring 128 comprises separate arcuate portions connected at location(s) 132.

As shown in FIG. 14, a plurality of hangers 134 may be provided with a generally u-shaped end 136 into which the debris ring 128 is placed. Thus, any debris repositioned by gravity or by a pizza brush may contact the debris ring 128 and fall into the debris channel 126.

In one form, at the beginning of every day or on a specific schedule, the drive motor 76 may be engaged prior to engaging any of the heating elements. This would cause the plate 22 to rotate without heat or flame, and any debris within the debris channel 126 may be safely vacuumed, brushed or otherwise removed therefrom without danger of the hot debris causing a fire or other damage to the vacuum.

Looking to FIGS. 20-23 the rotating cooking plate 22 is shown including a plurality of flanges 138. As can be appreciated by looking to FIG. 11, these flanges 138 attached to the upper ends 140 of the struts 70 and maintain the cooking plate 22 thereupon through rotation.

In FIG. 20, an example is shown utilizing a support structure of spokes 168 fastened at a radially inward end 170 to the debris ring 94 or center collar. The radially outward end 174 may be attached to a ring 176 including or attached to the debris ring 126 by way of fasteners 176, welding, or other methods. In one example, this allows the support structure to be made of a different material than the cooking plate 22. For example, the support structure shown in FIG. 20 may be made of stainless steel and the cooking plate 22 made of aluminum for improved thermal conductivity. This support structure also facilitates producing the cooking plate 22 and/or debris ring 126 out of several segments which may then be attached to the support structure independently. In FIG. 13 for example, the cooking plate is shown made of segments. Making of the cooking plate 22 and/or debris ring 126 out of several segments in a floating manner helps the apparatus to operate in such varied temperatures. Finishing layers may be applied to the cooking plate and/or debris ring after assembly to promote a smooth and even surface.

Looking to FIGS. 16 and 17; different views of the perimeter flame manifold 68 are shown. FIG. 17 generally shows a rear side of the flame manifold 68 as the region 17 of FIG. 15. FIG. 15 shows a slightly different example from that shown in FIG. 13. In FIG. 15 there is only one panel 52 between the flame manifold 68 and the opening through which the pizza or other cooked food will be removed. This is to better position the flame manifold in the cooking process as the plate 22 rotates. FIG. 16 shows the fluid input conduit 142 in fluid communication with a plurality of flame jets 144 contained by a housing 146. In one form an igniter 148 is provided and has some point along the assembly so as to provide remote ignition of the flame manifold 68. In one form, the igniter 148 is a piezoelectric igniter. As the flame will transfer from flame jet to flame jet provided a relatively small gap there between, igniters 148 are generally not needed at each flame jet 144. In one form, a burner jet spring 150 may be provided at each flame jet 144.

Figure 18:
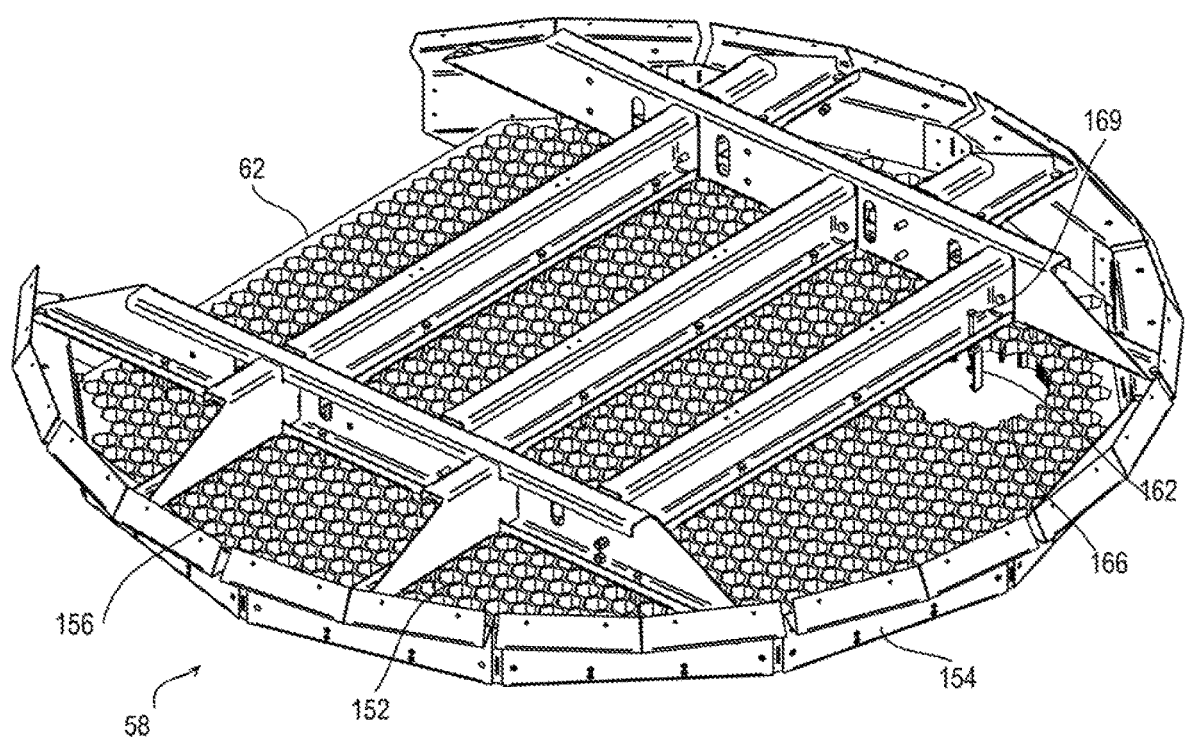
FIG. 18 is a top isometric view of a ceiling assembly component of the example shown in FIG. 1.
Figure 19:
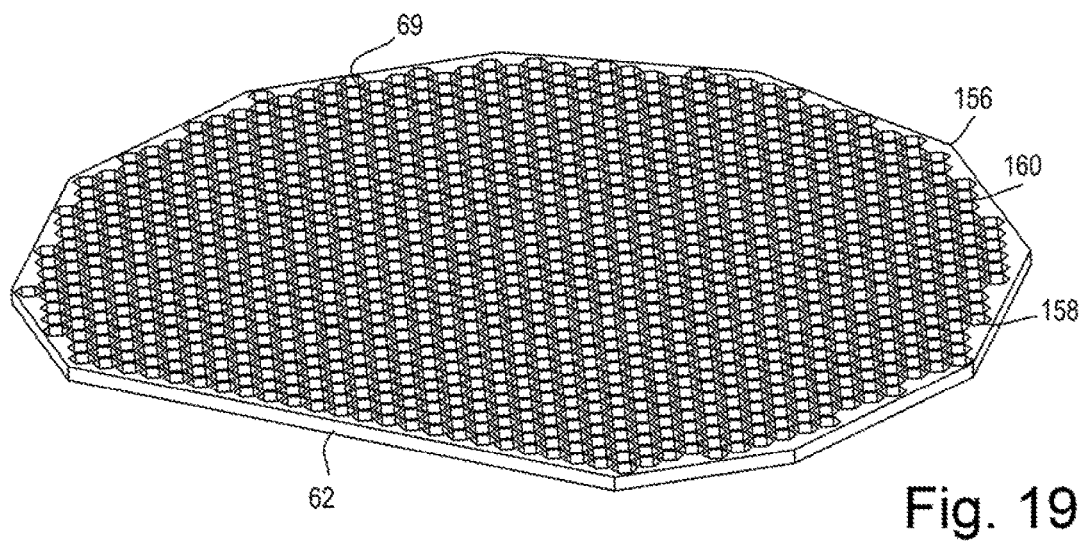
FIG. 19 is a top isometric view of a ceiling cast component of FIG. 18.

Looking to FIGS. 18 and 19, the ceiling assembly 58, which generally comprises a support frame 152, a perimeter member 154, and a ceiling casting 156, is shown. The ceiling casting 156 in one example is formed of a honeycomb metallic structure 158 into and onto which is poured a ceramic fluid 160 which then hardens and cures to form the ceiling casting 156. In one form, the honeycomb metallic structure 158 is formed of stainless steel to provide sufficient rigidity and support of the ceiling casting 156. In one form, a plurality of hangers 162 may be fastened to the frame 152 and then project down into the honeycomb structure and loosely attached thereto. Once the ceramic fluid 160 is hardened thereabout, the hangers 162 are fixed in place and bolts or other fasteners 164 may be utilized to secure the hangers 162 to the frame 152. The opening 166 shown in FIG. 18 is for illustrative purposes and may not be a physical structure of the final product as can be understood by looking to FIG. 19.

In one form, a safety feature may be implemented, where opening of any of the access doors closes all gas supply valves and prohibits rotation of the cooking plate until all access doors are closed, and a reset may also be utilized.

Easily accessible controls may be provided for temperature balance between the center and perimeter flame jets as a function of cooking chamber temperature, base temperature of the cooking plate 22, and rotational speed of the cooking plate 22.

As can be appreciated, both the casting 156, and the perimeter member 154 may be shaped to conform to the inner surface of the cooking chamber 66. For example, the casting 156 shown in FIG. 19 has 11 sides. In this example, 10 sides conform to the inner wall of the cooking chamber, and one side conforms to the ducting 60. The sides would form a regular 12-sided polygon, if not for the front forming an entry opening doorway 46 and ductwork 60.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore we claim:

1. An oven for cooking of foodstuffs, the oven comprising:
   a cooking chamber;
   the cooking chamber bounded on the lower surface by a cooking plate,
   at least one heat element below the cooking plate;
   at least one heat sensor positioned at a first region of the cooking plate;
   the at least one heat sensor configured to determine the localized temperature of the first region of the cooking plate before the first region is positioned over the at least one heat element; and
   circuitry configured to engage the at least one heat element to provide a calculated amount of heat via the at least one heat element to the first region for a calculated time as the first region is positioned above the at least one heat element.

2. The cooking oven as recited in claim 1 wherein the at least one heat sensor comprises more than two independent heat sensors at separate circumferential positions below the cooking plate.

3. The cooking oven as recited in claim 2 wherein each heat sensor is connected to circuitry configured to engage a heat element uniquely connected to each heat sensor.

4. The cooking oven as recited in claim 1 wherein the oven comprises a debris ring removably attached to an inner surface of the oven and extending downward into a perimeter debris collecting channel of the cooking plate.

5. The cooking oven as recited in claim 1 comprising:
   a perimeter multi-flame manifold at a circumferentially offset location in the cooking chamber relative to the doorway; and
   circuitry coupled to valves controlling fluid (gas) flow to the central radiant heating flame and separately actuated valves controlling fluid (gas) flow to the perimeter multi-flame manifold to maintain a thermal output offset between the central radiant heating flame and perimeter multi-flame manifold.

6. The cooking oven as recited in claim 5 wherein the circuitry is coupled to a thermal detector in the cooking chamber to adjust the thermal output of the central radiant heating flame and perimeter multi-flame manifold as a function of the temperature within the cooking chamber.

7. The cooking oven as recited in claim 1 wherein the at least one heat element below the cooking plate is a radiant heat element.

8. The cooking oven as recited in claim 7 wherein the at least one radiant heat element is a gas flame heat element.

9. The cooking oven as recited in claim 7 wherein the radiant heat element is a fiber mesh heat element.

10. The cooking oven as recited in claim 1 further comprising:
    at least one sensor detecting the localized temperature of the air adjacent the cooking plate; and
    a control apparatus varying the thermal output of the at least one heat element below the cooking plate as a function of the sensed localized temperature.

11. The cooking oven as recited in claim 1 further comprising:
    at least one sensor detecting entry of an uncooked foodstuff;
    circuitry programmed to account for the additional thermal load added to the system by the uncooked foodstuff; and a control apparatus varying the thermal output of the at least one heat element below the cooking plate as a function of the uncooked foodstuff.

12. The cooking oven as recited in claim 1 comprising a central heat deflector positioned radially between the central radiant heating flame and a baking region of the cooking plate.

13. The cooking oven as recited in claim 1 wherein the cooking plate further comprising a perimeter multi-flame manifold at a circumferentially offset broiling region in the cooking chamber.

14. The cooking oven as recited in claim 1 further comprising a baking region comprising a heat shield above the cooking plate and below the uppermost internal surface of the cooking chamber.

* * * * *